United States Patent [19]
Dillmann

[11] Patent Number: 5,120,489
[45] Date of Patent: Jun. 9, 1992

[54] HYDRAULIC CONTROL ROD DRIVE

[75] Inventor: Charles W. Dillmann, Morgan Hill, Calif.

[73] Assignee: General Electric Company, San Jose, Calif.

[21] Appl. No.: 674,016

[22] Filed: Mar. 25, 1991

Related U.S. Application Data

[63] Continuation-in-part of Ser. No. 553,073, Jul. 10, 1990.

[51] Int. Cl.$^5$ .............................................. G21C 7/16
[52] U.S. Cl. ...................................... 376/230; 376/241
[58] Field of Search ............... 376/226, 230, 231, 242; 976/DIG. 127, DIG. 119

[56] References Cited

U.S. PATENT DOCUMENTS

| | | | |
|---|---|---|---|
| 3,406,093 | 10/1968 | Paratesi | 376/230 |
| 3,785,923 | 1/1974 | Bratoljic et al. | 376/227 |
| 3,945,514 | 3/1976 | Dose | 214/27 |
| 3,957,577 | 5/1976 | Treshow | 376/230 |
| 4,030,972 | 6/1977 | Groves | 376/230 |
| 4,238,288 | 12/1980 | Anikin et al. | 376/230 |
| 4,423,002 | 12/1983 | Wiart et al. | 376/227 |
| 4,624,825 | 11/1986 | Martin et al. | 376/227 |
| 4,686,077 | 8/1987 | Straub | 376/230 |
| 4,775,506 | 10/1988 | Dubourg | 376/230 |
| 5,034,184 | 7/1991 | Stevens et al. | 376/231 |

OTHER PUBLICATIONS

Wilkins et al, *Advanced BWR: Design Improvements Build on Proven Technology*, Nuclear Engineering International, reprint Jun. 1986, pp. 1-7 and drawing entitled "The World's Reactors No. 89".

Westinghouse Electric Corp., (G. Masche), "3.2 Control Rod Drive Mechanisms," Systems Summary Of A Westinghouse Pressurized Water Reactor Nuclear Power Plant, 1971, pages: Cover and three following pp. 47-51; and FIG. 2—2.

General Electric Company (GE), *BWR/6 Operating Fundamentals*, "The Control Rod and Control Rod Drive Mechanism," pp. 1-11, Table 1, FIGS. 1-4; Control Rod Drive Hydraulic System, pp. 1-9, and FIGs. 1-3, undated, provided to GE Customers more than one year ago.

*Primary Examiner*—Brooks H. Hunt
*Assistant Examiner*—Frederick H. Voss
*Attorney, Agent, or Firm*—Robert R. Schroeder

[57] ABSTRACT

A drive for positioning a control rod in a nuclear reactor core is disclosed. The drive includes a housing having a piston disposed therein, with a piston rod extending from the piston and through the housing for being joinable to the control rod. A driving fluid is provided into the housing for exerting a pressure force against the piston for moving the piston and the control rod. The output requirements for the driving fluid are varied in response to the position of the piston for selectively controlling intermediate positions of the piston.

13 Claims, 4 Drawing Sheets

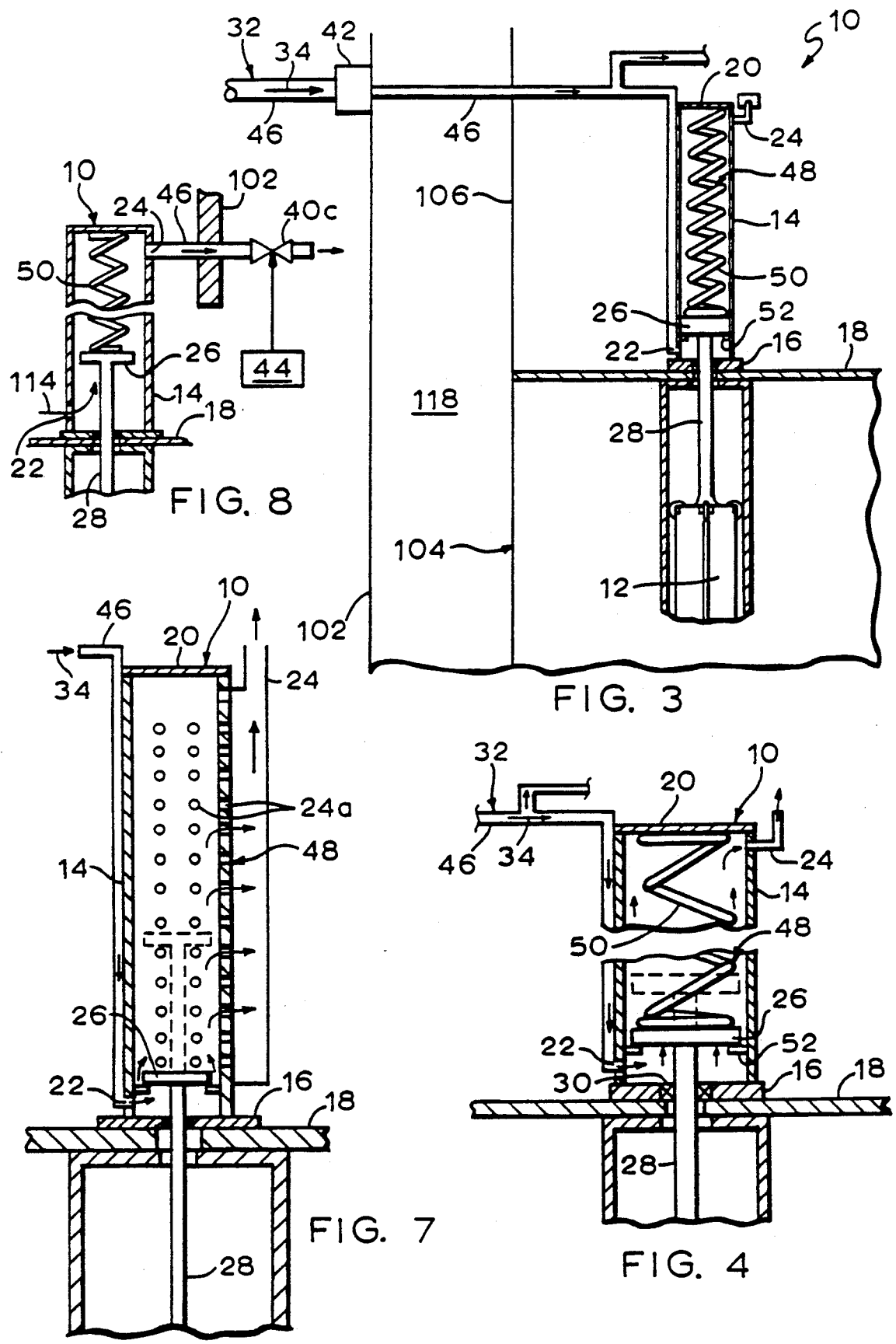

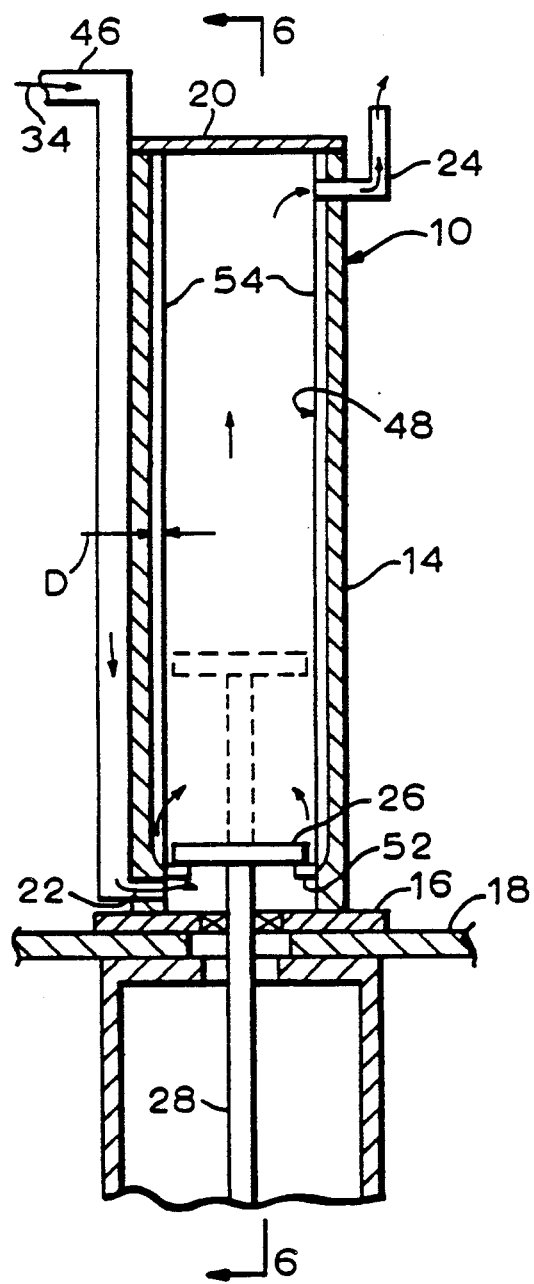
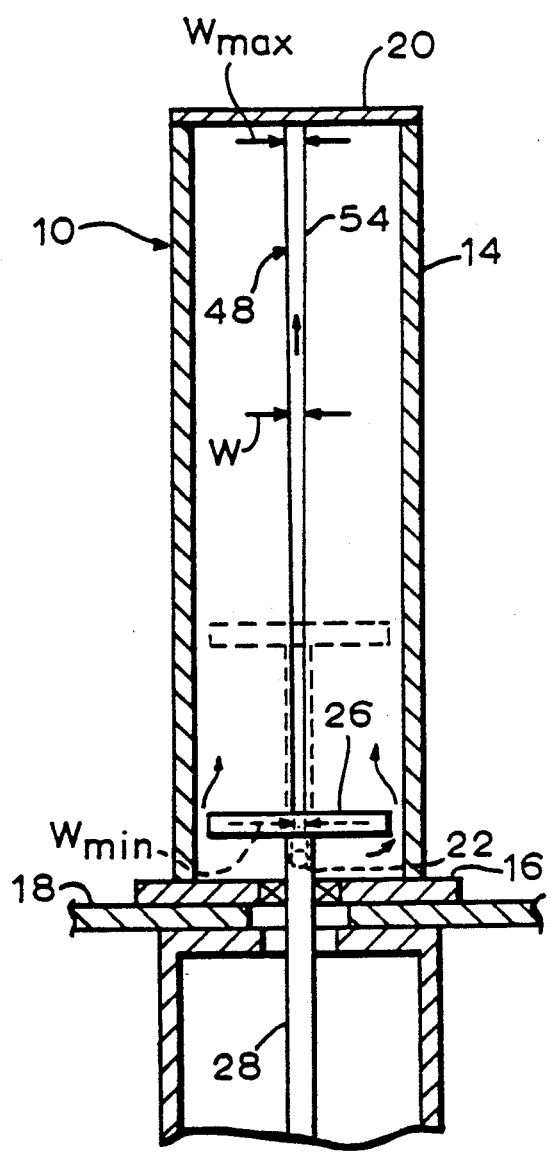
FIG. 5
FIG. 6

HYDRAULIC CONTROL ROD DRIVE

CROSS REFERENCE TO RELATED APPLICATION

This is a continuation-in-part of application Ser. No. 07/553,073, filed 10 July 1990.

TECHNICAL FIELD

The present invention relates generally to a boiling water reactor (BWR), and, more specifically, to a drive for positioning a control rod within the reactor core thereof.

BACKGROUND ART

A conventional boiling water reactor includes a reactor pressure vessel within which is disposed a nuclear reactor core having a plurality of fuel bundles. The core is effective for generating heat released from nuclear reactions for boiling water contained in the vessel for generating steam to power a steam turbine for driving, for example, an electrical generator for providing power to a utility grid. The reactor core typically includes a plurality of control rods which are selectively inserted and withdrawn therefrom by conventional control rod drives (CRDs) for controlling the nuclear reaction rate within the core. A typical nuclear reactor includes a substantial number of control rods and corresponding control rod drives, for example, over 200 of each. The control rod drives are typically mounted externally of the vessel at either the upper of lower closure head of the vessel and have push rods which extend through the vessel and into the reactor core. Conventional control rod drives either function hydraulically or electro-mechanically for positioning the control rods within the reactor core.

In both the top and bottom mounted control rod drives described above, relatively large apertures through the reactor pressure vessel are required by the drives for translating the control rods, and, therefore, require suitable sealing to prevent leakage of the high pressure water contained in the vessel. Furthermore, bottom mounted CRDs are disposed below the reactor core which complicates maintenance procedures for preventing leakage or draining of the water from the vessel when individual CRDs are removed during maintenance.

Bottom mounted CRDs also require increased servicing area below the vessel which necessarily requires a taller containment building, and attendant increased cost. Since the number of conventional CRDs typically is greater than about 200, the area under the vessel is relatively congested, and requires suitable access areas for required maintenance operations. Conventional recirculation pumps also typically extend from the bottom of the vessel adjacent to the CRDs, which additionally congest the area under the vessel.

On the other hand, top mounted CRDs present the additional problem that all of the service lines to the CRDs must be disconnected and removed prior to removal of the CRDs, and of the upper closure head of the pressure vessel, during maintenance operations which require the removal thereof.

Conventional CRDs also require the ability for obtaining relatively fast insertion of the control rods during a scram condition, which is typically provided by a high pressure accumulator which injects a high pressure driving fluid into the CRDs for quickly inserting the control rods. In the case of bottom mounted CRDs, the scram operation occurs against the force of gravity.

OBJECTS OF THE INVENTION

Accordingly, one object of the present invention is to provide a new and improved control rod drive.

Another object of the present invention is to provide a hydraulic control rod drive which is relatively simple and has few operating components.

Another object of the present invention is to provide a control rod drive which may be contained totally within a reactor pressure vessel and provided with a driving fluid from outside the pressure vessel.

Another object of the present invention is to provide a control rod drive having a scram capability provided at least in part by gravity.

DISCLOSURE OF INVENTION

A drive for positioning a control rod in a nuclear reactor core is disclosed. The drive includes a housing having a piston disposed therein, with a piston rod extending from the piston and through the housing for being joinable to the control rod. A driving fluid is provided into the housing for exerting a pressure force against the piston for moving the piston and the control rod. The output requirements for the driving fluid are varied in response to the position of the piston for selectively controlling intermediate positions of the piston.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 3 is an enlarged longitudinal sectional view of one of the control rod drives illustrated in FIG. 2 shown with a portion of the adjacent components of the reactor.

FIG. 4 is an enlarged longitudinal sectional view of the control rod drive illustrated in FIG. 3.

FIG. 5 is a schematic longitudinal sectional view of the control rod drive illustrated in FIG. 2 in accordance with an alternate embodiment of the present invention.

FIG. 6 is a longitudinal transverse sectional view of the control rod drive illustrated in FIG. 5 taken along line 6—6.

FIG. 7 is a schematic longitudinal sectional view of the control rod drive illustrated in FIG. 2 in accordance with an alternate embodiment of the present invention.

FIG. 8 is a schematic longitudinal sectional view of the control rod drive 10 illustrated in FIG. 2 in accordance with an alternate embodiment of the present invention.

MODE(S) FOR CARRYING OUT THE INVENTION

Figure 1:
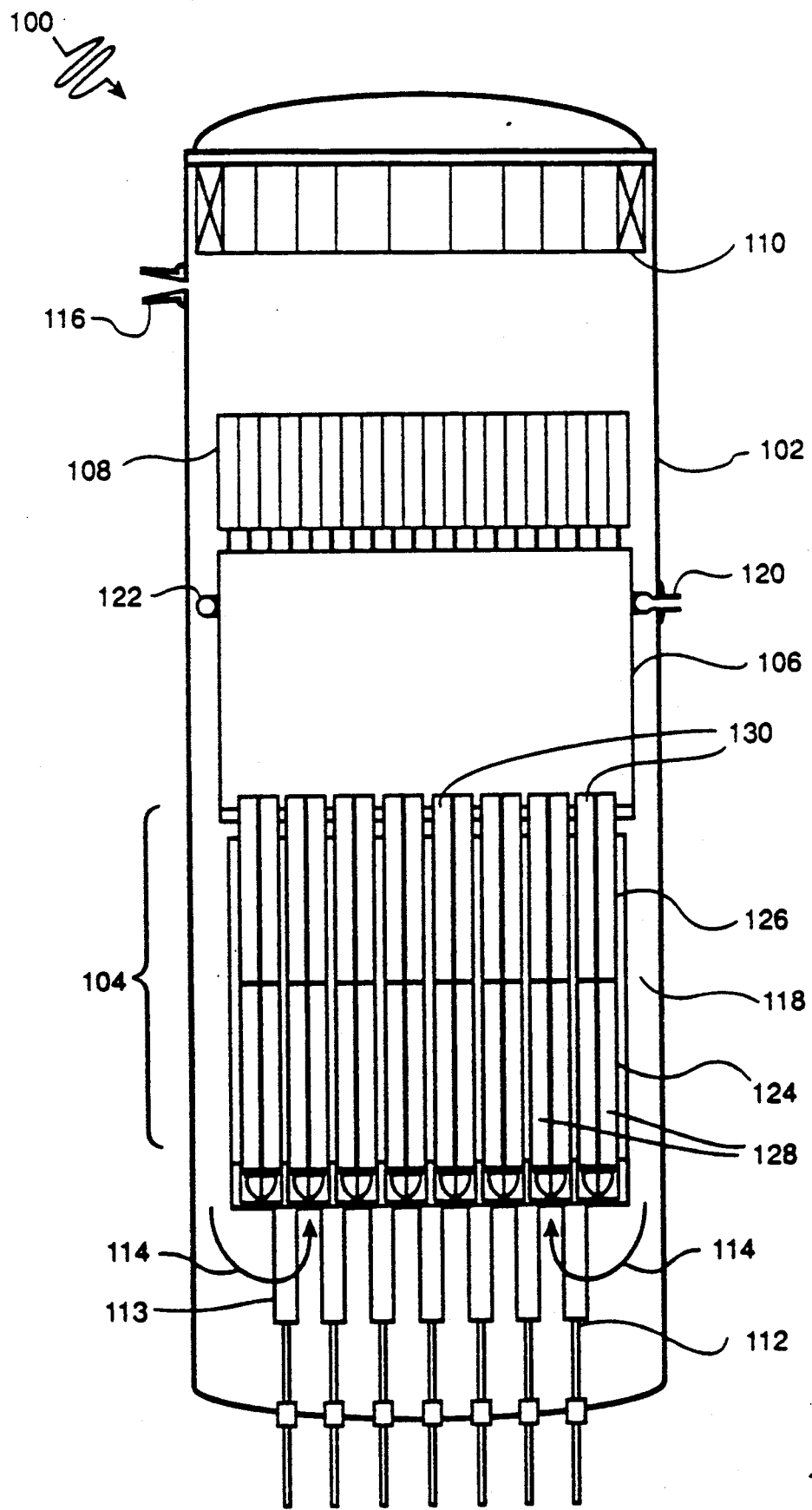
FIG. 1 is a schematic elevational sectional view of an exemplary nuclear reactor in accordance with one embodiment of the present invention.

As illustrated in FIG. 1, an exemplary, natural circulation boiling water reactor 100 comprises a pressure vessel 102, a core 104, a chimney 106, a steam separator 108, and a steam dryer 110. In one embodiment of the present invention, control rod drive housings 112 extend through the bottom of the vessel 102 and support control rod guide tubes 113. The control rod guide tubes 113 extend to the bottom of the core 104 so that control blades therein can be inserted into and retracted from the core 104 to control its power output.

Water flows, as indicated by arrows 114, into the core 104 from below. This subcooled water is boiled within the core 104 to yield a water/steam mixture which rises through the chimney 106 to a water level 114b (see FIG. 2) from which the steam is dispelled upwardly. The steam separator 108 helps separate steam from water, and the released steam exits through a steam exit 116 near the top of the vessel 102. Before exiting, any remaining water entrained in the steam is removed by the dryer 110. The separated water is returned down a peripheral downcomer 118 by the force of gravity. Feedwater enters the vessel 102 through a feedwater inlet nozzle 120 and feedwater sparger 122 to replenish and to help cool the recirculating water in the downcomer 118.

The core 104 comprises a lower fuel matrix 124 and an upper fuel matrix 126. The upper fuel matrix 126 is filled with upwardly oriented fuel bundles 130, and the lower fuel matrix 124 is filled with downwardly oriented fuel bundles 128. Spaces are left between groups of four adjacent fuel bundles for control rods having cruciform cross sections to move vertically to regulate power output.

Figure 2:
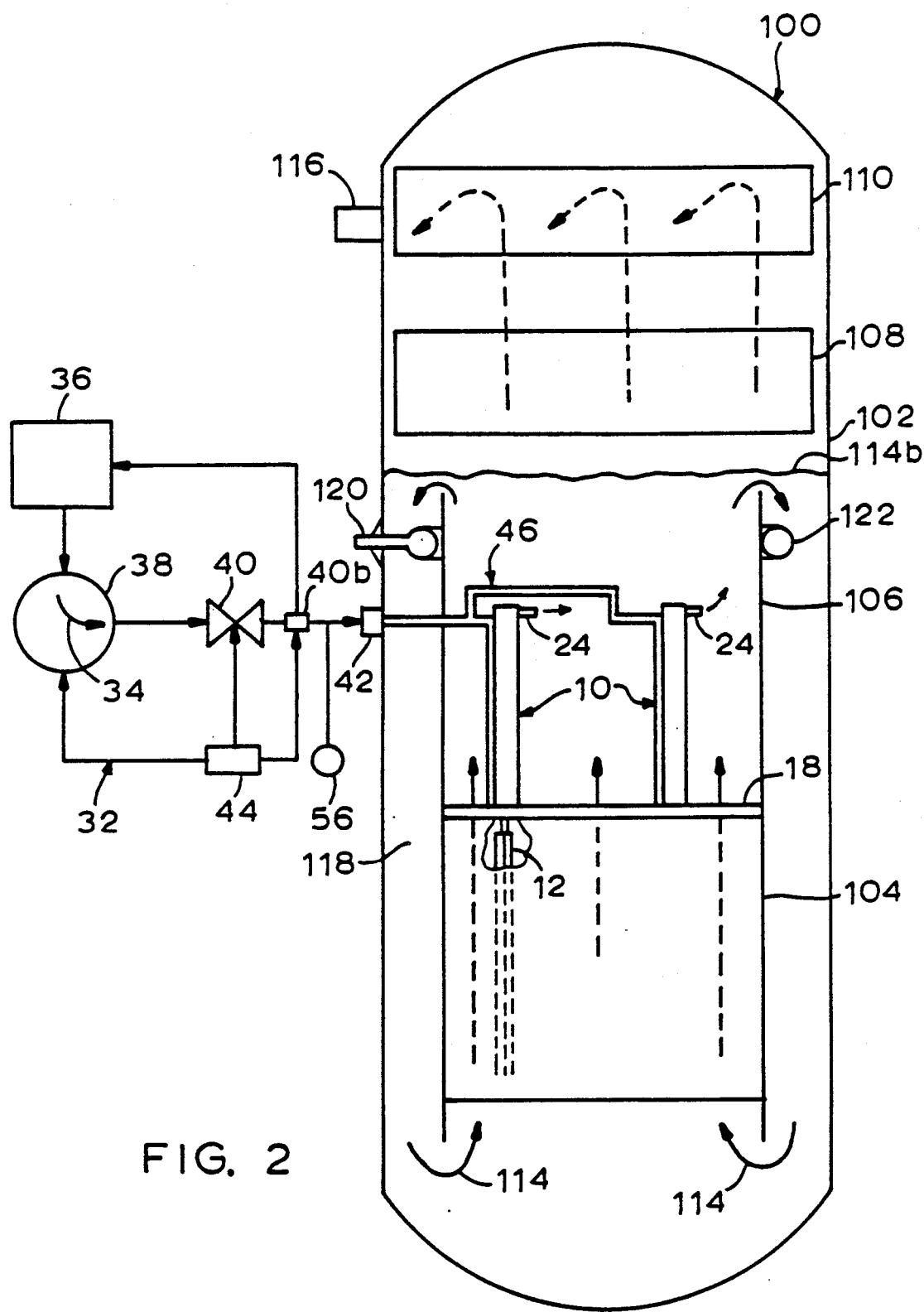
FIG. 2 is a schematic elevational sectional view of the reactor illustrated in FIG. 1 having a control rod drive in accordance with an alternate embodiment of the present invention.

Illustrated in FIG. 2 is a schematic representation of the reactor 100 having a plurality of hydraulic, preferably water powered, drives 10 each for positioning a respective conventional control rod or blade 12 in the reactor core 104 for controlling the power output thereof. Although only two control rod drives (CRDs) 10 are illustrated in FIG. 2, it is to be understood that they are representative of a substantial number of CRDs 10, which, for one embodiment of the invention, include about 200 CRDs 10.

In the preferred embodiment of the present invention, all moving components for translating the control rods 12 are disposed vertically above the core 104 and wholly within the vessel 102, which is in contrast to the embodiment of the invention illustrated in FIG. 1 wherein the control rod drive housings 112 are disposed below the core 104 and penetrate the lower enclosure head of the vessel 102. However, the description hereinbelow for the preferred CRDs 10 mounted above the core 104 is equally applicable to such CRDs 10 mounted upsidedown in the vessel 102 below the core 104 with or without penetrating the vessel 102, although all of the objectives available for mounting the CRDs 10 above the core 104 may not be obtained in that embodiment.

Furthermore, although the CRDs 10 are preferably mounted wholly within the vessel 102 above the core 104, they may also be mounted below the core 104 either wholly within the vessel 102 or penetrating the lower enclosure head of the vessel 102 as illustrated in FIG. 1.

In a preferred embodiment of the present invention, the control blades 12 are positioned using the hydraulic control rod drive 10 shown in FIG. 3. In this embodiment, the movable control blade 12 is used. The control blade 12 is lifted by water flow past a piston that is attached to the upper end of the blade 12.

More specifically, illustrated in FIGS. 3 and 4 is an exemplary embodiment of one of the CRDs 10 shown in FIG. 2. The CRD 10 includes a stationary, elongate, tubular housing 14 having a proximal, or base, end 16 conventionally fixedly joined to the top of the core 104, for example by being bolted to a conventional top guide plate 18 thereof. The housing 14 preferably extends vertically upwardly from the proximal end 16 and has a distal, or top, end 20. A fluid inlet 22 is preferably located at the bottom of the housing 14 adjacent to the proximal end 16. A fluid outlet 24 is preferably disposed at the top of the housing 14 adjacent to the distal end 20. The fluid outlet 24 is preferably disposed in direct flow communication with the vessel 102 for discharge therein, or may, alternatively, be joined to a conduit extending through the vessel 102 for discharge outside the vessel 102.

Disposed inside the housing 14 for axially slidable translation therein, is an annular piston 26 disposed axially between the inlet 22 and the outlet 24. An elongate piston rod 28 is fixedly joined to the piston 26, for example by being formed integrally therewith, and extends downwardly therefrom through the housing proximal end 16 and into the core 104. A conventional fluid seal 30 is disposed centrally in the proximal end 16 and around the piston rod 28 for providing a seal therewith for preventing fluid leakage from the housing 14 past the piston rod 28. The piston rod 28 is conventionally fixedly joined to the control rod 12 within a conventional control rod guide tube 113 for providing axial translation movement of the control rod 12 upon axial translation movement of the piston rod 28 in the housing 14.

Referring again to FIG. 2, means 32 are provided for providing a pressurized driving fluid 34 into the housing 14 through the inlet 22 for exerting a pressure force against the piston 26 for lifting or moving the piston 26 and in turn moving the piston rod 28 and the control rod 12. More specifically, as shown in more detail in FIG. 4, the driving fluid 34 channeled into the housing 14 below the piston 26 exerts an upwardly directed pressure force on the piston 26 which is predeterminedly selected to be at least as great as the weight of the piston 26, piston rod 28, and control rod 12 for lifting or withdrawing the control rod 12 from the reactor core 104 for controlling the power output of the core 104.

In a preferred embodiment of the present invention, the outlet 24 simply provides a vent to the housing 14 which allows the top side of the piston 26 to be subject to the pressure within the vessel 102. Accordingly, the fluid providing means 32 is effective for providing the driving fluid 34 at a predetermined pressure greater than the pressure inside the vessel 102 for generating a differential pressure across the piston 26 in the upward direction for lifting the control rod 12. At such a differential pressure across the piston 26, the piston 26 will move to the top or distal end 20 of the housing 14 for fully withdrawing the control rod 12 from its fully inserted position in the core 104. When the driving fluid 34 is interrupted by the means 32, the differential pressure across the piston 26 will be eliminated and the piston 26, piston rod 28, and control rod 12 will drop by gravity for returning the control 12 to its fully inserted position in the core 104. In this way, the differential pressure across the piston 26 may be used for withdrawing the control rod 12, whereas the interruption of the differential pressure will allow for relatively rapid insertion of the control rod 12 by gravity in a conventional scram operation.

In an exemplary embodiment, the fluid providing means 32, as illustrated schematically in FIG. 2, includes a fluid source 36, which, for example, may include a portion of the feedwater being returned from a conventional steam turbine (not shown) which extracts energy from the steam provided from the reactor 100 through the steam exit 116. Accordingly, the preferred driving fluid 34 is water, or the feedwater, which is compatible with the coolant flow, or water, 114 inside the vessel 102 to which the driving fluid 34 is discharged from the housing outlet 24. The fluid providing means 32 further includes a conventional, selectively variable-speed pump 38 disposed in flow communication with the fluid source 36, and which is effective for pressurizing the driving fluid 34 to a pressure for generating the required differential pressure across the piston 26 to lift the piston 26 and in turn lift the piston rod 28 and control rod 12 against the force of gravity for withdrawing the control rod 12 from the core 104.

A conventional, selectively variable control valve 40 may optionally be disposed in flow communication between the pump 38 and a driving fluid inlet 42 disposed on the vessel 102. A conventional electrical controller 44 is operatively connected to the pump 38 and the control valve 40 for controlling the speed of the pump 38 and the flow through the valve 40. The controller 44 is effective for varying the output of the pump 38 and the flow through control valve 40 for controlling both the output flowrate and pressure of the driving fluid 34. In this way, the driving fluid 34 may be selectively provided to the CRDs 10 for withdrawing the control rods 12 by providing the pressurized driving fluid 34 for lifting the piston 26, or for interrupting the driving fluid 34 and in turn eliminating the differential pressure across the piston 26 for allowing the piston 26, piston rod 28, and control rod 12 to drop by gravity for fully inserting the control rod 12 within the reactor core 104.

The fluid providing means 32 may also optionally include a second control valve 40b disposed in flow communication between the inlet 42 and the fluid source 36, and operatively connected to the controller 44, for selectively dumping the driving fluid 34 from the fluid inlet 42 back to the fluid source 36 for more quickly effecting the scram operation.

As described above, and as represented schematically in FIG. 2, there are a substantial number of the CRDs 10, each of which may be operated independently of each other, or in groups of which may be operated in unison and independently of the remaining groups thereof. For example, an individual fluid providing means 32 as illustrated in FIG. 2 may be provided for each of the CRDs 10 for obtaining independent operation of each CRD 10. However, it is more practical to group the CRDs 10 together, as represented schematically by the two CRDs 10 shown in FIG. 2 which have a common fluid providing means 32 for operating the CRDs 10, including the pistons 26 thereof, in unison. In such an embodiment, the fluid inlet 42 is joined in parallel flow communication with the plurality of CRDs 10 by conventional fluid conduits 46 joined to the respective inlets 22 of the CRDs 10. By providing substantially identical configurations and sizes of the plurality of CRDs 10, the pistons 26 thereof may be operated in unison for obtaining substantially identical withdrawal and insertion of the respective control rods 12 joined thereto upon application or interruption of the differential pressure across the pistons 26.

However, once the differential pressure acting across the piston 26 is obtained for just balancing the weight being supported by the piston 26, including that of the control rod 12, the piston 26 and the control rod 12 will tend to float within the housing 14, which is undesirable for accurately controlling the power output of the core 104. Accordingly, increased differential pressure is desired to prevent such floating and to fully withdraw the control rod 12, but it is desirable for the CRD 10 to have the capability to accurately position the control rod 12 at selected intermediate positions between the fully inserted and fully withdrawn position.

Accordingly, and as shown in FIGS. 3 and 4, the CRD 10 preferably also includes means 48 responsive to the axial provision of the piston 26 within the housing 14 for varying the output requirements of the fluid providing means 32 to selectively control the intermediate position of the piston 26, and thereby the control rod 12. The means 48 are effective for resisting the CRD 10 so that a resistance to movement increases with increasing blade displacement.

Referring again to FIGS. 3 and 4, an exemplary embodiment of the varying means 48 is illustrated. The piston 26 can be in a constant cross-section housing, or tube, 14 and be compressing a spring which will result in the effect of more flow further raising the blade 12. The means 48 preferably include a spring 50 disposed between the piston 26 and the housing 14 which has a changeable length as the piston 26 translates for providing a spring force of increasing resistance to movement of the piston 26 as the piston 26 moves within the housing 14 for withdrawing the control rod 12 from the reactor core 14. In a preferred embodiment of the invention, the spring 50 is a compression spring disposed between the housing distal end 20 and the top side of the piston 26, with the spring 50 being further compressed to increase the spring resistance force as the piston 26 is moved from the housing proximal end 16 toward the housing distal end 20 as the control rod 12 is withdrawn from the reactor core 104. Since the weight of the components hanging from the piston 26 is constant, the spring 50 provides an increasing resistance force as the control rod 12 is withdrawn for more accurately positioning the control rod 12 in intermediate positions between its fully withdrawn and fully inserted positions.

Since the spring 50 provides increasing resistance to the upward travel of the piston 26, the output requirements of the fluid providing means 32 (as shown in FIG. 2) vary, or increase, for matching the increasing resistant force. More specifically, the pressure of the driving fluid 34 must be suitably increased below the piston 26 for providing a larger differential pressure across the piston 26, and a resulting larger upwardly directed pressure force for balancing the weight and spring forces acting on the piston 26 as the piston 26 is moved to its intermediate positions. Accordingly, the required increased pressure in the driving fluid 34 may be obtained by increasing the output pressure of the pump 38 by increasing its rotational speed, or, alternatively, by regulating the output pressure of the pump 38 by controlling the flow through the control valve 40.

The spring 50 illustrated in FIGS. 3 and 4 not only provides for effective control of the vertical position of the piston 26, and therefore of the control rod 12, but also assists in the scram operation. When the flow of the driving fluid 34 is interrupted to the CRD 10, the differential pressure acting across the piston 26 will be removed and the piston 26 will drop by gravity to the housing proximal end 16. The spring 50, being a compression spring, will continue to exert a downwardly directed force against the piston 26 for more rapidly inserting the control rod 12 into the reactor core 104. The housing 14 preferably also includes a plurality of circumferentially spaced stops 52, which may simply be pins extending horizontally and radially inwardly from the housing 14 at the housing proximal end 16 and above the inlet 22 against which the piston 26 will come to rest when the driving fluid 34 is interrupted.

Although the spring 50 in the preferred embodiment of the present invention is a compression spring, tension springs could also be utilized between the piston 26 and the proximal end 16, but would, necessarily, require an increase in length of the housing 14.

Illustrated in FIGS. 5 and 6 is the CRD 10 having an alternate embodiment of the varying means 48. More specifically, in this embodiment of the invention, the housing inlet 22 is again disposed adjacent to the proximal end 16, and the housing outlet 24 is again disposed at the housing distal end 20. The piston 26 travels in the housing 14, which is preferably a cylinder which has progressively larger cross-section axial notches machined in its walls. Thus it takes increasingly larger flows to raise the blade higher.

The varying means 48 preferably include the housing 14 having at least one axial notch, or groove, 54, with two circumferentially spaced grooves being shown, extending vertically in an inner surface of the housing 14. The grooves 54 are preferably straight and disposed parallel to the piston rod and vertically within the housing 14, although the grooves 48 could also spiral, for example. Each of the grooves 54 preferably has a varying cross sectional flow area with a minimum flow area adjacent to the inlet 22 at the housing proximal end 16, and a maximum flow area adjacent to the outlet 24 at the housing distal end 20 for allowing controlled leakage, or bypass, of a portion of the driving fluid 34 around the piston 26, with the bypass portion increasing as the piston moves higher from the proximal end 16 toward the distal end 20 to withdraw the control rod 12.

In an exemplary embodiment, each of the grooves 54 has a constant depth D, and a width W which increases from the inlet 22 to the outlet 24. The groove width W has a minimum value $W_{min}$ adjacent to the inlet 22 and a maximum $W_{max}$ adjacent to the outlet 24. The cross sectional flow area of the groove 54 is simply the product of the depth D and the width W which increases along the height of the groove 54.

Accordingly, as the piston 26 translates upwardly within the housing 14, a portion of the driving fluid 34 will leak or be bypassed around the outer perimeter of the piston 26 and into the grooves 54. This controlled bypass of the driving fluid 34 around the piston 26 requires continually increasing amounts of the driving fluid 34 from the fluid providing means 32 (as shown in FIG. 2) as the piston 26 rises in the housing 14. Accordingly, the fluid providing means 32 is effective for providing the driving fluid 34 at higher output flow rates as the piston 26 moves higher within the housing 14. This may be accomplished by simply increasing the speed, and resulting flow output, of the pump 38, or alternatively, by further opening the control valve 40 for increasing output of the driving fluid 34.

Illustrated in FIG. 7 is the CRD 10 having the varying means 48 in accordance with an alternate embodiment of the present invention. This third case would have a series of holes along the length of the housing, or tube, 14 that are progressively uncovered as the piston 26 raises. More specifically, the varying means 48 include the outlet 24 having at least one row of bypass holes 24a extending through the housing 14 and spaced vertically from each other from the inlet 22 to the housing distal end 20. The bypass holes 24a are effective for discharging collectively from the housing 14 between the piston 26 and the inlet 22 a bypass portion of the driving fluid 34. The bypass portion increases as the piston moves higher from the proximal end 16 toward the distal end 20 and positions more of the bypass holes 24a between the piston 26 and the inlet 22.

In the preferred embodiment of the present invention, each of the rows of bypass holes 24a is vertically aligned, with each of the plurality of bypass holes being circumferentially spaced from each other. In alternate embodiments of the invention, only one row of the bypass holes may be required, and the holes may have varying positions circumferentially around the housing 14 in the vertical direction as long as additional bypass holes 24a are uncovered as the piston 26 rises within the housing 14.

Accordingly, an increasing volume flowrate of the driving fluid 34 is required through the inlet 22 for further increasing the vertical position of the piston 26 as more of the bypass holes 24a are positioned between the piston 26 and the inlet 22. The bypass driving fluid 34 is discharged from the housing 14 and is channeled either directly into the reactor vessel 102, or into a common outlet 24 for discharge therein.

The fluid providing means 32 (as illustrated in FIG. 2) is, therefore, effective for increasing the flowrate of the driving fluid 34 channeled to the CRDs 10, by either increasing the velocity and output of the pump 38, or by further opening the control valve 40.

Of course, in each of the above embodiments of the present invention, the piston 26 may be predeterminedly moved downwardly within the housing 14 by selectively decreasing the pressure and flow output of the driving fluid 34 provided to the respective CRDs 10. And, in any case, stopping of the pump 38 will cause the rod 12 to be inserted by gravity, thereby effecting scram.

In all of the above embodiments, the position of the control rod 12 within the core 104 may be indicated indirectly by means 56 as illustrated in FIG. 2 for sensing the hydraulic pressure, or flowrate, or both, of the driving fluid 34 channeled to the CRDs 10. The position sensing means 56 may be calibrated for providing a correspondence between the position of the control rod 12 within the core 104 as a function of the pressure or flowrate, or both, of the driving fluid 34. Alternatively, a conventional electrical probe such as a linear variable differential transformer (LVDT) may be suitably joined to the piston rod 28 for directly indicating the vertical position of the piston rod 38, and in turn, the vertical position of the control rod 12 within the core 104. Other conventional position indicators could also be used.

Illustrated in FIG. 8 is a CRD 10 having the fluid providing means 32 in accordance with another embodiment. More specifically, the housing 14 is again positioned inside the vessel 102 containing the water 114 under a vessel pressure. The inlet 22 is disposed inside the vessel 102 for directly receiving the pressurized water 114. The outlet 24 is joined to a fluid conduit 46 in flow communication with a selectively variable venting control valve 40c also electrically connected to the controller 44.

The venting valve 40c is preferably disposed outside the vessel 102 and is effective for selectively venting the outlet 24 outside the vessel 102 to a pressure lower than the vessel pressure for generating the differential pressure across the piston 26. In this way the position of the piston 26 can be controlled by selectively venting the top side of the piston 26 through the outlet 24. The spring 50 is again used in this embodiment as it was in the FIG. 3 embodiment, which is substantially identical except for how the differential pressure across the piston 26 is generated. Scram is effected by closing the valve 40c which allows the pressure across the piston 26 to equalize, and gravity and the spring 50 inserting the piston rod 28. This will require the vessel 102 to be suitably pressurized to start-up.

The CRDs 10 are preferably mounted to the top of the core 104, and preferably to the top guide plate 18 along with the fuel bundles extending downwardly therefrom so that they may be installed and removed from the vessel 102 along with the fuel bundle to which they are mounted. Alternatively, the CRDs 10 may be mounted on any convenient internal components of the vessel 102 so that they may be removed separately from the fuel bundles.

The CRDs 10 in accordance with the present invention provide a considerable simplification relative to conventional control rod drives currently in use. They also eliminate the need for large penetrations of the pressure vessel 102, since only stationary and relatively small fluid conduits 46 are required for breaching the vessel 102. The CRDs 10 may also be preferably mounted above the core 104, thusly eliminating the conventional under vessel mounting configuration typically used in a boiling water reactor. The CRDs 10 may also be shorter than conventional control rod drives and when mounted above the core 104 as disclosed above, still allow room for the use of the conventional steam separator 108 and steam dryer 110 thereabove. Furthermore, gravity aided scram is an additional advantage of the CRDs 10 which is self effecting upon loss of the driving fluid 34 or power to the pump 38.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A drive for positioning a control rod between fully inserted and fully withdrawn positions in a nuclear reactor core comprising:
 a stationary housing having a proximal end, a distal end, a fluid inlet, and a fluid outlet;
 a piston disposed in said housing and having a piston rod extending therefrom through said housing proximal end, said piston rod being joinable to said control rod for providing axial movement thereof;
 means for selectively providing a driving fluid into said housing through said inlet for exerting a pressure force against said piston for moving said piston and in turn moving said piston rod and said control rod; and
 means responsive to position of said piston for varying by increasing output requirements of said fluid providing means as said control rod is withdrawn from said reactor core to selectively control intermediate positions of said piston and thereby said control rod between said fully inserted and fully withdrawn positions.

2. A control rod drive according to claim 1 wherein:
 said housing is disposed in a vertical position above said reactor core and said proximal end is fixedly joined thereto;
 said inlet is disposed adjacent to said housing proximal end and below said piston, and said outlet is disposed at least in part above said piston; and
 said fluid providing means are effective for providing said fluid to said housing to lift said piston and in turn lift said piston rod and said control rod for withdrawing said control rod from said reactor core, and for interrupting said fluid for allowing said piston, piston rod, and control rod to drop by gravity so that said piston moves to said housing proximal end, and in turn positions said control rod fully within said reactor core.

3. A control rod drive according to claim 2 wherein:
 said outlet is disposed at said housing distal end;
 said varying means include a spring disposed between said piston and said housing for providing a spring force of increasing resistance to movement of said piston as said piston moves for withdrawing said control rod from said reactor core; and
 said fluid providing means are effective for providing said fluid at larger differential pressures across said piston as said piston moves against said spring force.

4. A control rod drive according to claim 3 wherein said spring is a compression spring disposed between said housing distal end and said piston, said spring being further compressed to increase said spring resistance force as said piston is moved from said housing proximal end toward said housing distal end as said control rod is withdrawn from said reactor.

5. A control rod drive according to claim 4 wherein said housing is disposed inside a vessel containing water at a vessel pressure, said outlet is vented inside said vessel, and said driving fluid is provided to said inlet at a pressure greater than said vessel pressure for generating said differential pressure across said piston.

6. A control rod drive according to claim 4 wherein said housing is disposed inside a vessel containing water at a vessel pressure, said inlet is disposed inside, said vessel for receiving said water, and said fluid providing means include said outlet being disposed in flow communication with a selectively variable control valve for selectively venting said outlet outside said vessel to a pressure lower than said vessel pressure for generating said differential pressure across said piston.

7. A control rod drive according to claim 2 wherein:
 said outlet is disposed at said housing distal end;
 said varying means include said housing having at least one elongate axial groove extending vertically in an inner surface of said housing, said groove having a varying cross sectional flow area with a minimum flow area adjacent to said inlet and a maximum flow area adjacent to said outlet for allowing bypass of a portion of said driving fluid around said piston, said bypass portion increasing as said piston moves higher from said proximal end toward said distal end to withdraw said control rod; and said fluid providing means are effective for providing said fluid at higher output flowrates as said piston moves higher.

8. A control rod drive according to claim 7 wherein said axial groove has a constant depth and a width increasing from adjacent said inlet to adjacent said outlet.

9. A control rod drive according to claim 2 wherein:
said varying means include said outlets having at least one row of bypass holes extending through said housing and spaced vertically from each other from said inlet to said housing distal end for discharging collectively from said housing between said piston and said inlet a bypass portion of said driving fluid, said bypass portion increasing as said piston moves higher from said proximal end toward said distal end and positions more of said bypass holes between said piston and said inlet; and said fluid providing means are effective for providing said fluid at higher output flowrates as said piston moves higher.

10. A control rod drive according to claim 9 wherein said row of bypass holes is vertically aligned.

11. A control rod drive according to claim 9 further including a plurality of circumferentially spaced ones of said row of bypass holes.

12. A control rod drive according to claim 2 further including a plurality of said control rod drives for positioning a plurality of said control rods, respectively, each control rod drive being configured independently of each other.

13. A control rod drive according to claim 2 further including a plurality of said control rod drives for positioning a plurality of said control rods, respectively, at least two of said control rod drives having a common fluid providing means for operating in unison.

* * * * *